United States Patent
Pawar et al.

(10) Patent No.: US 10,516,285 B2
(45) Date of Patent: Dec. 24, 2019

(54) WIRELESSLY PROVIDING POWER TO A FULLY DISCHARGED BATTERY

(71) Applicant: INTEL CORPORATION, Santa Clara, CA (US)

(72) Inventors: Sagar C. Pawar, Aurangabad (IN); Prakash Pillai, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 774 days.

(21) Appl. No.: 14/725,586

(22) Filed: May 29, 2015

(65) Prior Publication Data

US 2016/0352134 A1    Dec. 1, 2016

(51) Int. Cl.
- *H02J 7/02* (2016.01)
- *H02J 50/80* (2016.01)
- *H02J 50/10* (2016.01)
- *H02J 7/04* (2006.01)

(52) U.S. Cl.
CPC ............. *H02J 7/025* (2013.01); *H02J 7/042* (2013.01); *H02J 50/10* (2016.02); *H02J 50/80* (2016.02)

(58) Field of Classification Search
CPC ........................................................ H02J 7/025
USPC ......................................................... 320/108
See application file for complete search history.

(56) References Cited

U.S. PATENT DOCUMENTS

| | | | |
|---|---|---|---|
| 7,782,020 B1 * | 8/2010 | Gumtow | G11C 5/141 320/134 |
| 7,948,209 B2 * | 5/2011 | Jung | H02J 7/025 307/104 |
| 8,797,288 B2 * | 8/2014 | Zaliva | G06F 3/04883 345/173 |
| 9,198,037 B2 * | 11/2015 | Chen | H04L 63/0492 |
| 9,310,868 B2 * | 4/2016 | Waters | G06F 1/263 |
| 2011/0136550 A1 * | 6/2011 | Maugars | H04B 5/0037 455/573 |
| 2014/0015478 A1 | 1/2014 | Von Novak | |
| 2014/0312708 A1 * | 10/2014 | Takahashi | H02J 50/60 307/104 |
| 2016/0163480 A1 * | 6/2016 | Lester | G06F 13/00 713/300 |
| 2016/0245873 A1 * | 8/2016 | Lee | G01R 31/3651 |

OTHER PUBLICATIONS

Porat et al., "Apparatus, System and Method of Multiple Device Wireless Power Transfer", PCT Patent Application No. PCT/US2013/077903, filed on Dec. 27, 2013, 55 Pages.

(Continued)

*Primary Examiner* — Jerry D Robbins
(74) *Attorney, Agent, or Firm* — International IP Law Group, P.L.L.C.

(57) ABSTRACT

Techniques for wireless charging in a system, method, and apparatus are described herein. An apparatus for charging at a wireless power receiver may include logic. The logic is configured to supply voltage received at the wireless power receiver at a first power level to a battery that is initially fully discharged, wherein the power of the first power level is received during a predefined interval of a fully discharged battery protocol. The logic is to monitor a second power level available at the battery, and initiate a wireless handshake with a wireless power transmitter inductively coupled to the wireless power receiver indicating configurations of the wireless power receiver upon detection of the second power level meeting or exceeding a predefined threshold.

20 Claims, 10 Drawing Sheets

(56) References Cited

OTHER PUBLICATIONS

Porat et al., "Wireless Mode Modulation", U.S. Appl. No. 14/495,776, filed Sep. 24, 2014, 24 pages.

* cited by examiner

WIRELESSLY PROVIDING POWER TO A FULLY DISCHARGED BATTERY

TECHNICAL FIELD

This disclosure relates generally to techniques for wireless charging. Specifically, this disclosure relates to providing power to a discharged battery in wireless power systems.

BACKGROUND ART

A basic wireless charging system may include a wireless power transmitter and a wireless power receiver. For example, a wireless power transmitter may include a transmit (Tx) coil, and a wireless power receiver may include receive (Rx) coil. Magnetic resonance wireless charging may employ a magnetic coupling between the Tx coil and the Rx coil. Typically, a wireless power receiver may perform a wireless handshake with the wireless power receiver in order to establish configuration of charging operations. However, in some cases, wireless handshakes may be impossible if a battery of the wireless power receiver is fully discharged.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

The present disclosure relates generally to techniques for wireless charging. As discussed above, wireless power transmitter (WPT) may include a transmit (Tx) coil, and a wireless power receiver (WPR) may include receive (Rx) coil. In some cases, a wireless handshake between a WPT and a WPR may be impossible if a battery of the wireless power receiver is fully discharged.

In some cases, the techniques discussed herein may be implemented using a wireless charging standard protocol, such as the specification provided by the Alliance For Wireless Power (A4WP) version 1.2.1, May 07, 2014. A wireless power Rx coil may be a component in a power receiving unit (PRU), while a wireless power transmission (Tx) coil may be a component in a power transmitting unit (PTU). However, the techniques discussed herein may be implemented in other wireless charging standard protocols such as the specification provided by the Wireless Power Consortium (WPC) version 1.1.2. For simplicity, the terms WPT and WPR may each be used to generally describe one type of PTU and PRU, respectively.

A fully discharged battery, as referred to herein, may include a battery that is unable to power circuitry to initiate wireless handshake protocols. As discussed more detail below, wireless charging protocols may vary based on many factors including wireless handshake protocols. However, the techniques described herein include discharged battery protocols tailored to individual handshake protocols.

Figure 1:
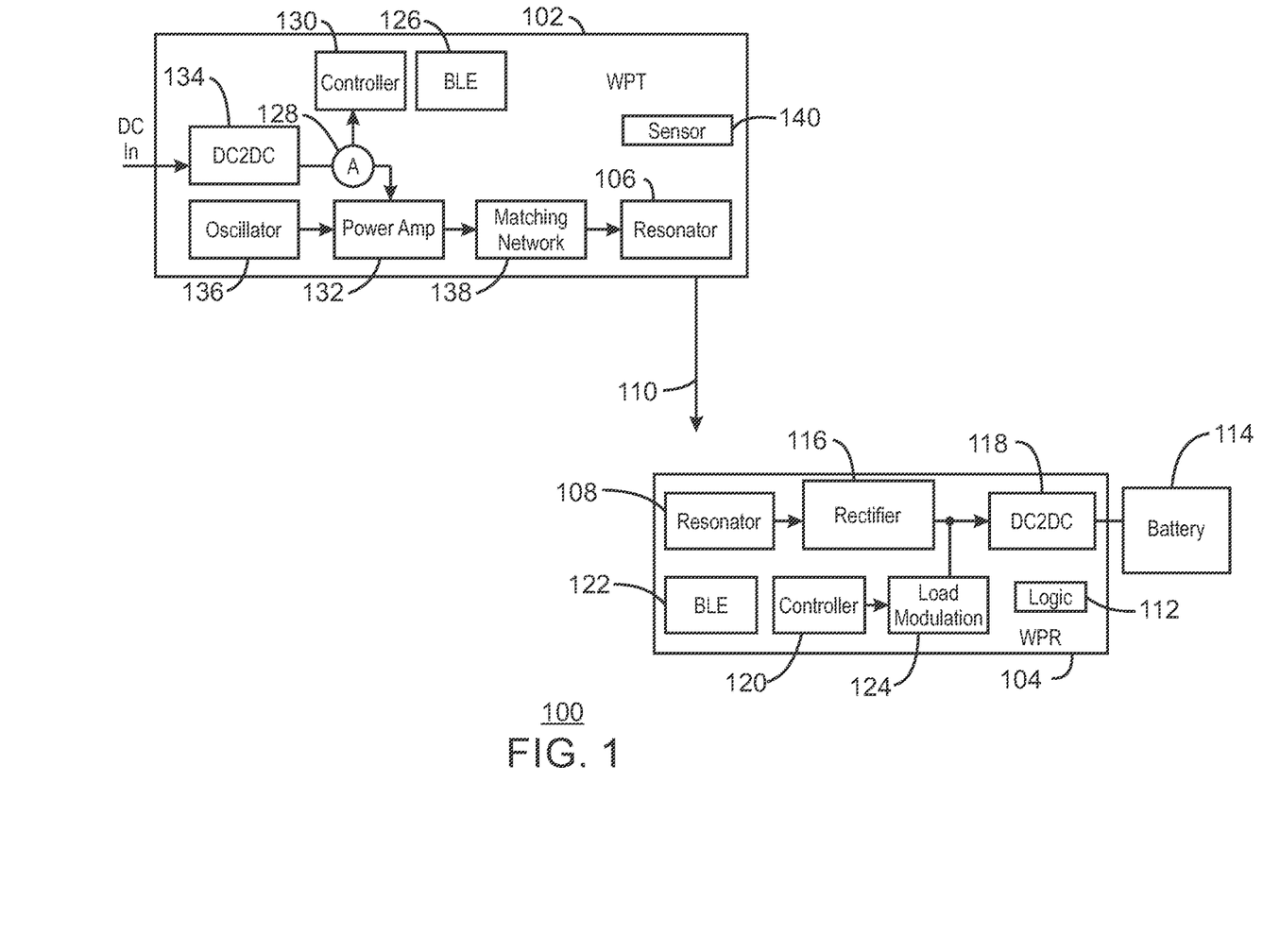
FIG. 1 is block diagram of a wireless power transmitter to provide power to a wireless power receiver.

FIG. 1 is block diagram of a WPT to provide power to a WPR. A WPT 102 may couple to a WPR 104 via magnetic inductive coupling between resonators 106, and 108, as indicated by the arrow 110. The resonator 106 may be referred to herein as Tx coil 106 of the WPT 102. The resonator 108 may be referred to herein as Rx coil 108 of the WPR 104.

As illustrated in FIG. 1, the WPR 104 may include logic 112. The logic 112 may be referred to herein as power logic 112. The power logic 112 may be configured as an integrated component of a rectifier 116, as an integrated component of a controller 120, as an integrated component of another element of the WPR 104, as a separate component of the WPR 104, or any combination thereof. The power logic 112 may be composed of one or more components, such as electronic circuit components, and may at least partially include hardware logic.

The power logic 112 may be configured to provide power received at the WPR 104 at a first power level to a battery 114 that is initially fully discharged. The power of the first power level is received during a predefined interval associated with a fully discharged battery protocol initiated at the WPT 102 inductively coupled to the WPR 104 via the Tx coil 106 and the Rx coil 108. The power logic 112 monitors power available at the battery 114 during charging of the initially fully discharged battery 114. The power logic 112 may initiate a wireless handshake with the WPT 102 indicating configurations associated with the WPR 104, wherein the wireless handshake is initiated upon detection that the second power level at the battery 114 meets or exceeds a predefined threshold. In some cases, the wireless charging of the battery 114 is performed at the minimum level possible based on the capabilities of the WPT 102.

When a dead battery or drained fully scenario exists, a device to be charged may be placed on a charging mat. In FIG. 1, the WPR 104 may be a component associated with a chargeable device. The Rx coil 108 may inductively couple to the Tx coil 106, wherein a voltage may be received at the Rx 108, and provided to a rectifier 116. The rectifier may be configured to generate a constant voltage. A direct current to direct current (DC2DC) converter 118 may use the rectified voltage stabilizes it and passes it to the power logic 112. The power level at the battery 114 may be monitored. In some cases, the voltage received may be passed to a controller 120. The controller 120 may be used to initiate wireless broadcast signals, such as a wireless handshake. In some cases, the wireless broadcast may be carried out by a wireless data transmission component such as a Bluetooth Low Energy (BLE) module 122. In some cases, the wireless data communication component may be integrated as operations of the controller 120, a load modulation circuit 124, the DC2DC converter 118, or any combination thereof, as discussed in more detail below.

The WPT 102 may include a wireless data communication component configured to receive wireless data, perform wireless handshake protocols, and the like with the wireless data communication component of the WPR 104. For example, the WPT may include a BLE module 126 configured to communicate with the BLE module 122. In some examples, the WPT 102 may also include a current sensor 128, a controller 130, a power amplifier 132, a DC2DC converter 134, an oscillator 136, and a matching network 138. The current sensor 128 may be an ampere meter, a volt meter, or any other sensor configured to sense load variations occurring due to inductive coupling between the WPT 102 and another object, such as the WPR 104. The current sensor 128 may provide an indication of load change to the controller 130 of the WPT 102. The controller 130 may power on the power amplifier 132 configured to receive direct current (DC) from the DC2DC converter 134, and to amplify and oscillate the current. An oscillator 136 may oscillate the power provided at a given frequency and a matching network 138 may be used to match the amplified oscillation provided to the resonator 106 of the WPT 102.

As discussed in more detail below, the WPT 102 may include a sensor 140. The sensor 140 may be configured to initiate a low power charging sequence when the battery 114 of the WPR 104 is fully discharged. In some cases, the sensor 140 may be a press-button associated, or integrated with, the WPT 102. In other cases, the sensor 140 may be touch sensor configured to detect interaction based on changes in capacitance, frequency, and the like that may be associated with user interaction at the sensor 140. In some cases the sensor 140 may be a wireless communication component that may communication with a similar component (not shown) on the WPR 104, such as a near-field communication device having persistent memory such as an identification tag storing data indicating whether the battery 114 is fully discharged. In some cases, a wireless communication component such as a near-field communication component may receive an indication via a detection circuit associated with WPR 104 that may be configured to detect a fully discharged battery. In any scenario, the WPT 102 is configured to initiate a fully discharged battery protocol wherein a power that is relatively low compared to normal operations is provided from the WPT 102 to the WPR 104. The power may be low enough to prevent harm to the WPR 104 before wireless charging handshake and configuration is performed. Further, the low power may be provided from the WPT 102 to the WPR 104 based on a predefined time period associated with the fully discharged battery protocol. In some cases, the predefined time period is selectable based on an interaction with the sensor 140, such as how long the sensor 140 is pressed, how many times the sensor 140 is pressed, or any other data that may be available via near field communication if in that scenario.

The block diagram of FIG. 1 is not intended to indicate that the WPT 102 and/or the WPR 104 are to include all of the components shown in FIG. 1. Further, the WPT 102 and/or the WPR 104 may include any number of additional components not shown in FIG. 1, depending on the details of the specific implementation.

Figure 2:
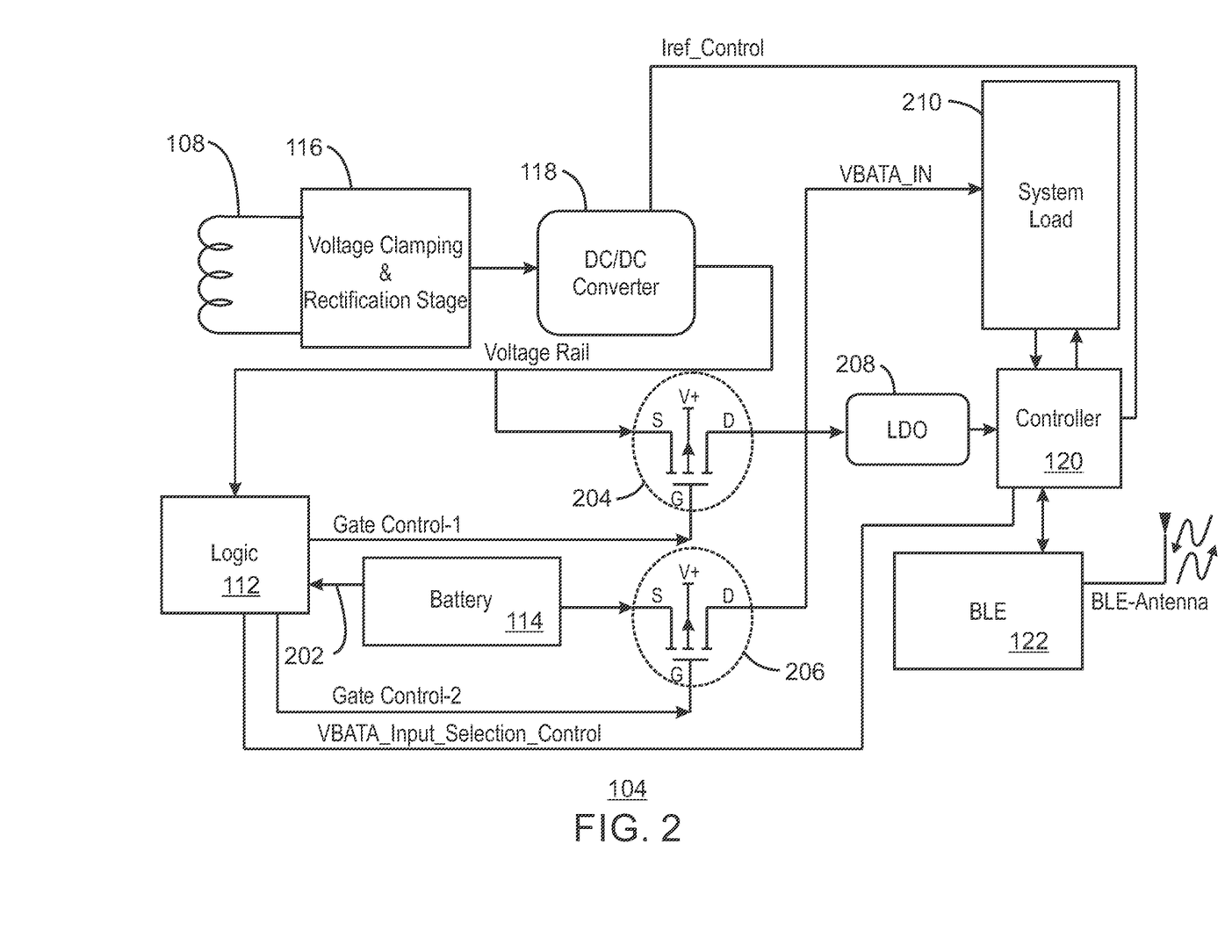
FIG. 2 illustrates a block diagram for addressing a dead battery scenario at a wireless power receiver.

FIG. 2 illustrates a block diagram for addressing a dead battery scenario at a wireless power receiver. FIG. 2 shows a WPR, such as the WPR 104 of FIG. 1. The Rx coil 108 provides voltage to the rectifier 116, which passes the voltage to the DCDC converter. The power logic 112 monitors battery 114 power, as indicated at 202. As illustrated in FIG. 2, the WPR 104 may include a first gate 204 and a second gate 206. During initial charge, when the battery 114 is fully discharged, gate 204 may be open and gate 206 may be closed. In other words, when the battery 114 is fully discharged, voltage provided from a WPT, such as the WPT 102 of FIG. 1 may be provided to the a control unit, such as the controller 120 of FIG. 1. In some cases, the voltage may be provided via a low dropout regulator (LDO) 208 configured to regulate the output voltage when the supply voltage is very close to the output voltage. Power received during a fully discharged battery protocol may also be passed to system load 210. System load 210 may refer to system power demands including the battery level of the battery 114.

In some cases, when the battery 114 is at or above a certain threshold, wireless handshake may be initiated at the BLE module 122. In some cases, the BLE module 122 may be initiated even when the battery 114 level is not at or above the threshold. However, once the power level of the battery 114 is detected to be at or above the threshold, the controller 120 may configure to the logic 112 to close gate 204 and open gate 206. Opening gate 206 and closing gate 204 may provide continued charging, and operation of the BLE module 122, the controller 120, and other components based on available battery power.

Figure 3:
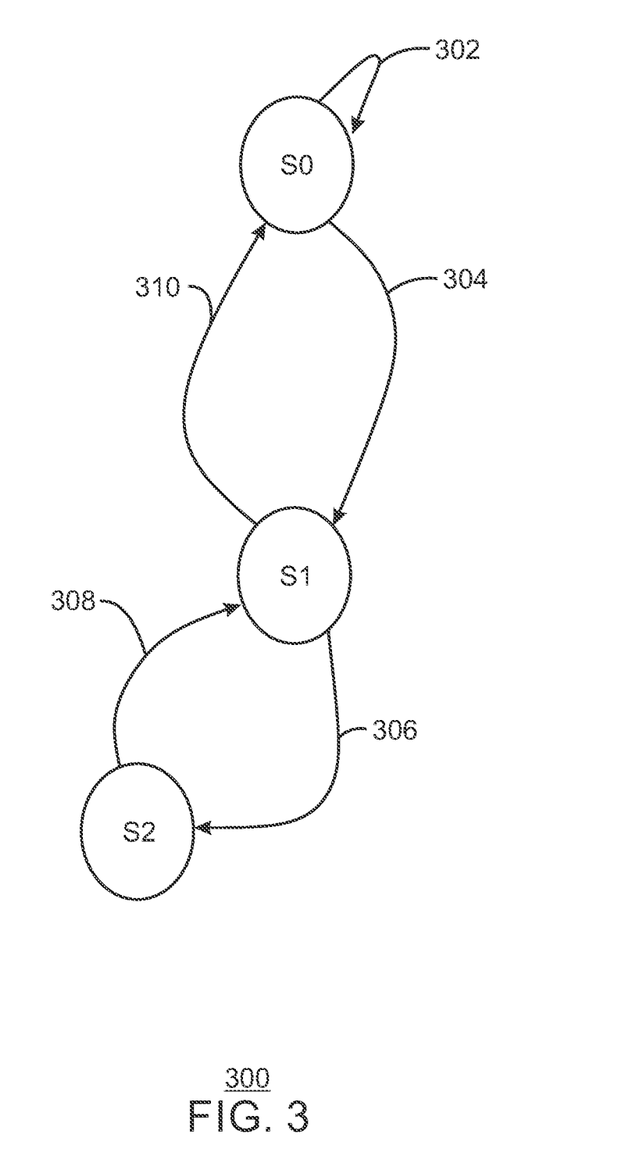
FIG. 3 illustrates a state diagram at a wireless power receiver for addressing a dead battery charging scenario.

FIG. 3 illustrates a state diagram 300 at a wireless power receiver for addressing a dead battery charging scenario. At edge 302, a battery, such as the battery 114, is dead or fully discharged, or no WPT 102 is present. An edge 304 represents when the device to be charged inductively couples to a Tx coil, such as the Tx coil 106 of FIG. 1. Constant magnetic flux may be translated to power such as voltage using a rectifier circuit 116, and the DCDC 118 converter may stabilize the received voltage. At edge 306, DCDC voltage source may be detected by the power logic 112 of FIG. 1. The constant voltage is passed through the gate 204 of FIG. 2, and the LDO 208 may initiate the controller 120. In state S1, the BLE module 122 may be initiated, and parameters may be broadcast in a wireless handshake. Once the battery 114 of FIG. 1 reaches a certain threshold, the controller 120 may direct the power logic 112 of FIG. 1 to close gate 204 and open gate 206.

Edge 308 indicates a scenario wherein power is cut off once the battery is fully charged, the device receiving charge is moved away from the WPT 102, and the like. Edge 310 indicates a scenario where the voltage is insufficient, the device receiving charge is moved away from the WPT 102, and the like.

Figure 4:
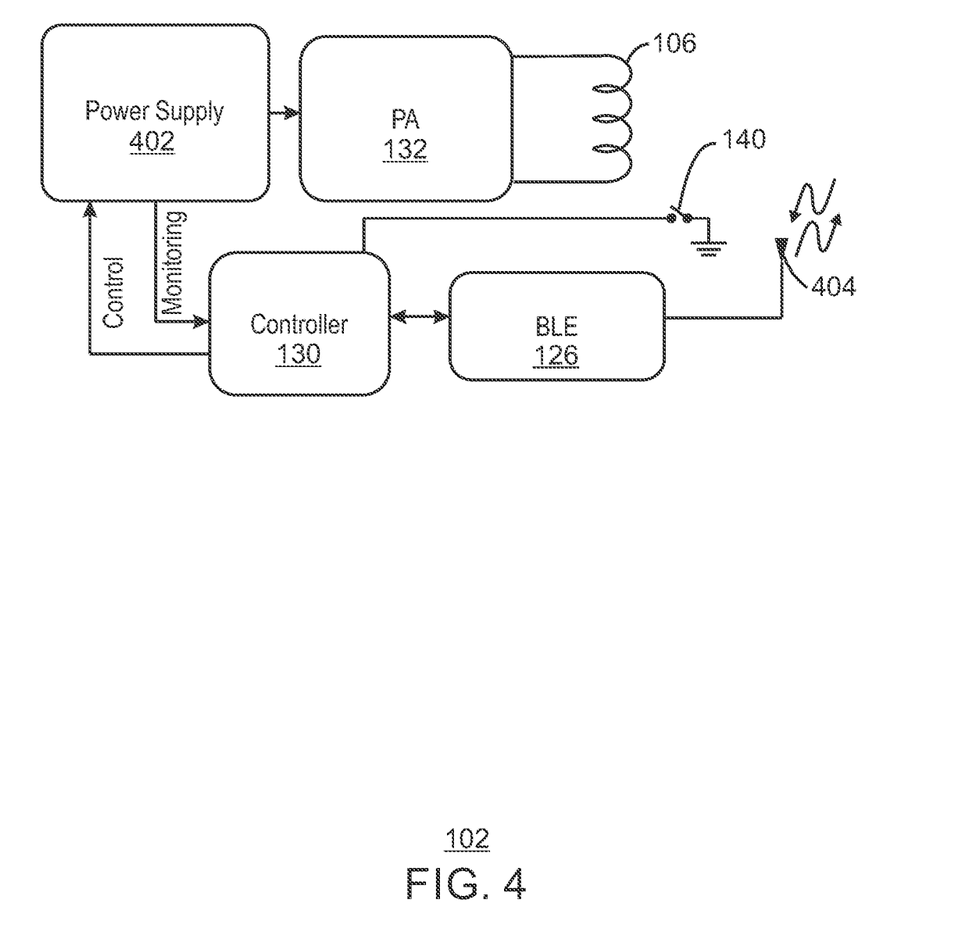
FIG. 4 illustrates a block diagram for addressing a dead battery scenario at a wireless power transmitter.

FIG. 4 illustrates a block diagram for addressing a dead battery scenario at a wireless power transmitter. As discussed above, a WPT, such as the WPT 102 may include a controller 130, a BLE module 126, a power amplifier 132, and a Tx coil 106, and a sensor 140. As discussed above in regard to FIG. 1, the sensor 140 may include various implementations including a touch sensor, a near field communication sensor, a button, and the like. When the sensor 140 is initiated. a power supply 402 may be initiated by the controller 130, and power may be provided to the Tx coil 106. The power provided from the power supply 402 may be at the lowest available level of the WPT 102. This low level of power may continue for a predetermined amount of time. For example, the low level voltage may be five minutes. In some cases, the predetermined amount of time may be selectable. For example, a user may press and hold, iteratively press, or otherwise interact with the sensor 140 generating an increase in the predetermined time period. Once a previously fully discharged battery on a WPR, such as the WPR 104 of FIG. 1, receives enough charge to send a BLE advertisement on to a BLE antenna 404, the low level voltage may be increased to normal operating voltage based on a handshake between the WPT 102 and the WPR 104.

Figure 5:
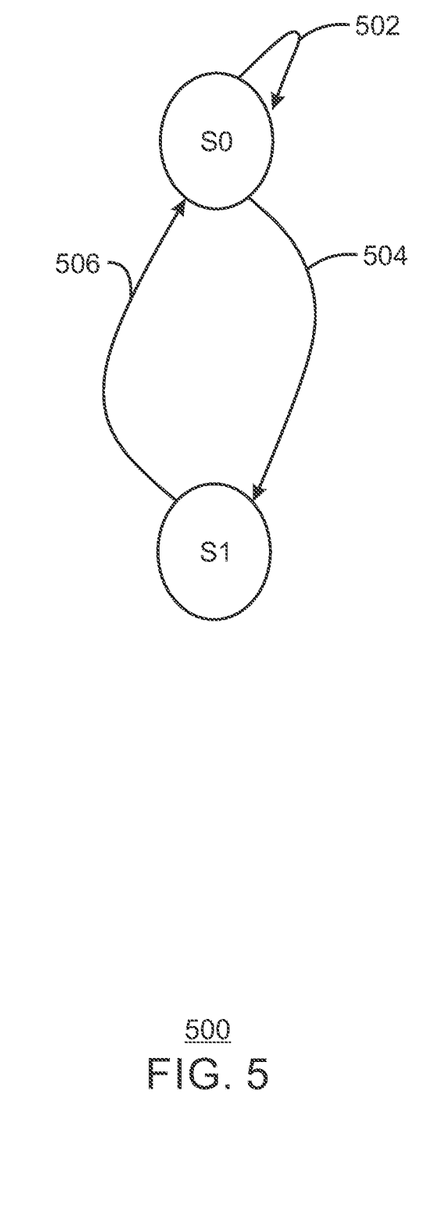
FIG. 5 illustrates state diagram for addressing a dead battery scenario at the wireless power transmitter.

FIG. 5 illustrates state diagram 500 for addressing a dead battery scenario at the wireless power transmitter. At edge 502, a WPT, such as the WPT 102 of FIG. 1 may scan for BLE broadcasts to detect any device to be charged. The WPT 102 may also scan for an indication from the sensor 140 of FIG. 1 to initiate the fully discharged battery protocol. If the signal from the sensor 140 is detected, and no device to be charged is detected for predetermined time period, the WPT 102 may return to sleep.

At edge 504, the sensor 140 may issue a signal in response an event such as human interaction with the sensor 140, detection of a device to be charged having a WPR, such as the WPR 104, via alternative means such as by near field communication, and the like. The predetermined time period for providing the low level power may begin, while continuing to scan for wireless handshake information. At edge 506, the state may return to S0 if the device is moved away from the WPT 102, if the battery charge is full, and the like.

Figure 6:
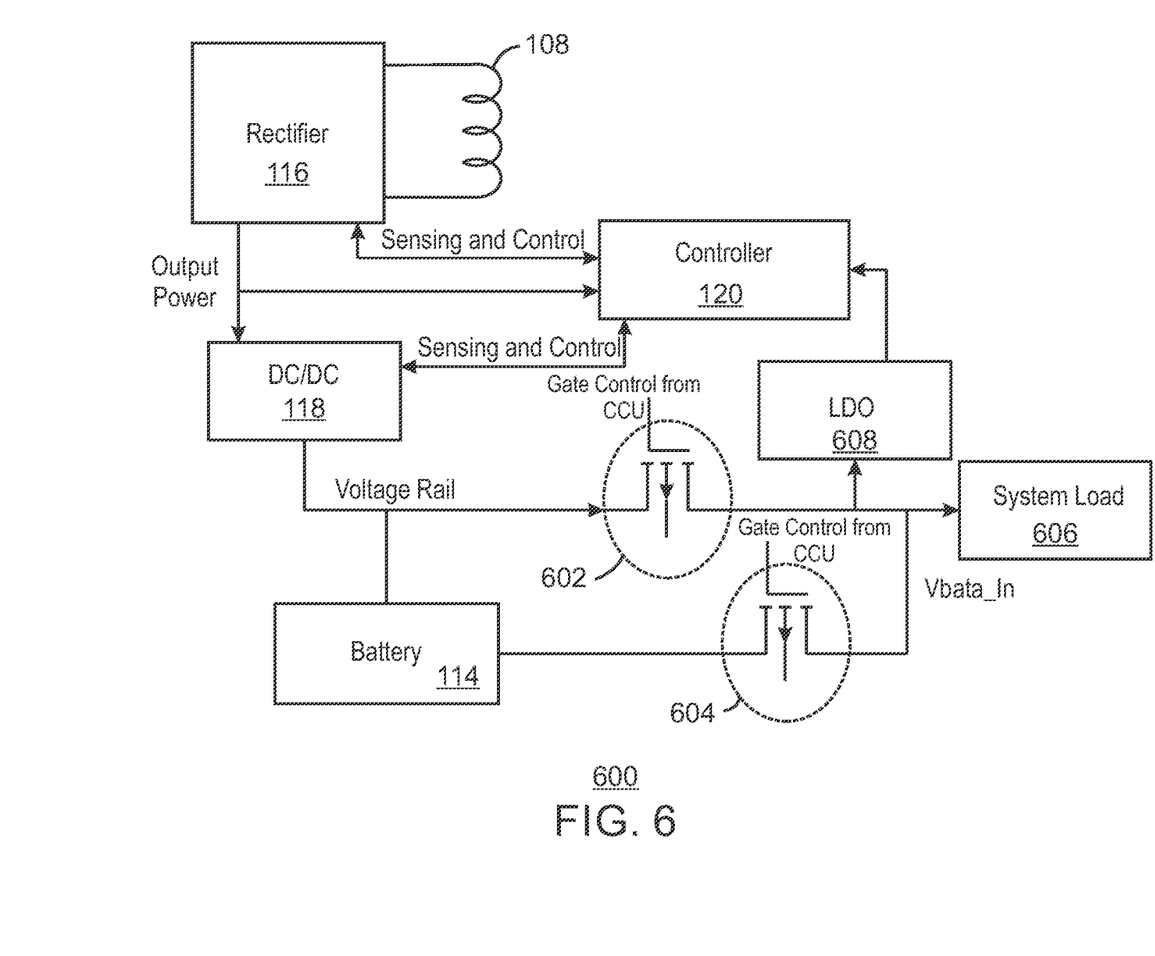
FIG. 6 illustrates an block diagram for addressing a dead battery at a wireless power receiver.

FIG. 6 illustrates a block diagram for addressing a dead battery at a wireless power receiver. In some cases, wireless handshaking may be performed using load modulation of wireless power received rather than BLE advertisements. As illustrated in FIG. 6, a WPR, such as the WPR 104 of FIG. 1 may lack a BLE module, but as power is received at the Rx coil 108, the DCDC converter 118 may be provided to the battery 114. Similar to FIG. 2 discussed above, the WPR 104 may include a first gate 602 and a second gate 604. The gate 602 may be turned on when the battery 114 does not contain enough charge to perform operations such as a wireless handshake with a WPT, such as the WPT 102. This may enable the battery 114 to be charged while providing power to system load 606, an LDO 608, and the controller 120. However, once the battery 114 is full enough, based on reference to a predetermined threshold, the gate 604 may be opened and the gate 602 closed.

Figure 7:
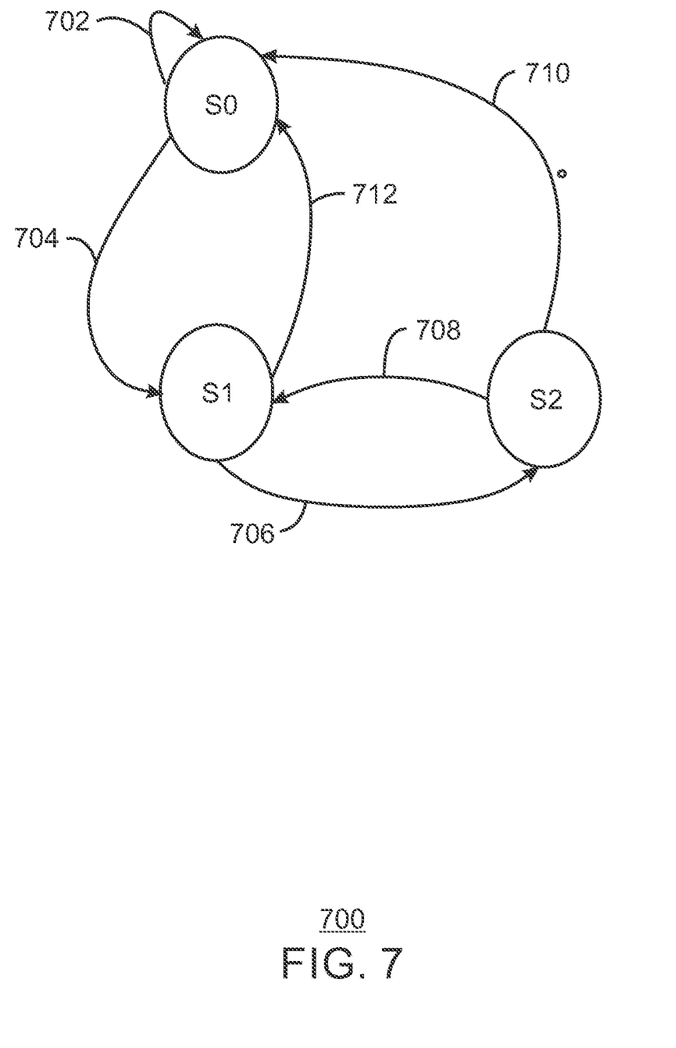
FIG. 7 illustrates a state diagram for addressing the dead battery charging scenario at a wireless power receiver.

FIG. 7 illustrates a state diagram for addressing the dead battery charging scenario at a wireless power receiver. At edge 702, no charging is being performed, the battery is fully discharged, or any combination thereof. At edge 704, a secondary coil power is sensed, such as power from the Tx coil 106 of FIG. 1, and the DCDC converter 118 is powered on. At 706, normal power is transferred and provided to the battery 114, the controller 120, or any combination thereof. At 708, the WPR 104 is reconfigured based on a wireless handshake indicating configuration. At 710, the state will return to S0 once the battery 114 is fully charged, and at 712, faults in the handshake may result in returning to the S0 state as well.

Figure 8:
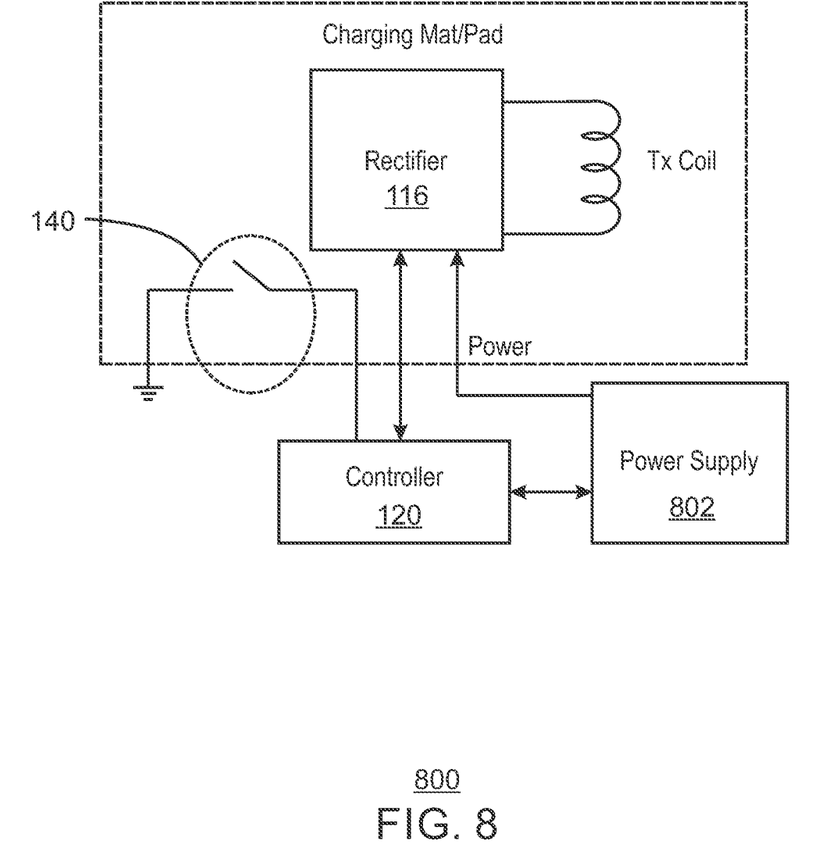
FIG. 8 illustrates a block diagram for wireless power transmitter to address dead battery charging.

FIG. 8 illustrates a block diagram 800 for wireless power transmitter to address dead battery charging. As described above in regard to FIG. 6, in some systems a WPT, such as the WPT 102 of FIG. 1 may use other means for transmitting wireless data and performing wireless handshakes. In FIG. 8, the controller 120 may be configured to detect load modulations performed at the WPR 104. The load modulations may be used to transmit patterns and wireless data associated with wireless handshake operations. Before the wireless handshake occurs in a fully discharged battery scenario, a sensor, such as the sensor 140 of FIG. 1 and indicated in FIG. 8 may issue a signal initiating a time period of relatively low power transmission.

The low power transmission during the time period of the initial charging of a fully discharged battery is low in comparison to normal operations when the battery is above a certain threshold and after the wireless handshake has been performed. In this manner, the low level of power transmission may be used to reduce harm that may occur if a larger power transmission were to damage a receiving unit such as the WPR 104 of FIG. 1.

Figure 9:
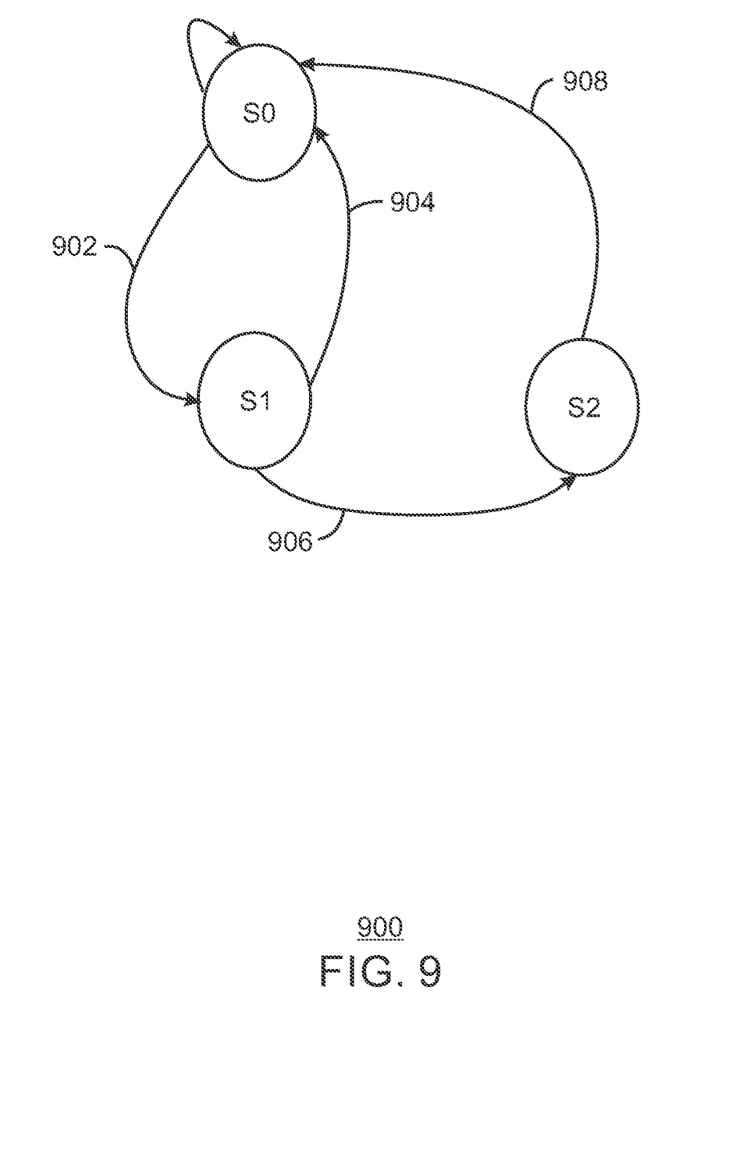
FIG. 9 illustrates a state diagram for addressing the dead battery charging scenario at a wireless power transmitter.

FIG. 9 illustrates a state diagram for addressing the dead battery charging scenario at a wireless power transmitter. At 902, sensor signal initiated, and the WPT 102 may transition from S0 to S1. At 904, the WPT 102 may exit from S1 to S0 after the predetermined time period associated with the sensor signal. At edge 906, a device detection error may occur and at edge 908, the WPT 102 may exit to S0 after logging the fault.

Figure 10:
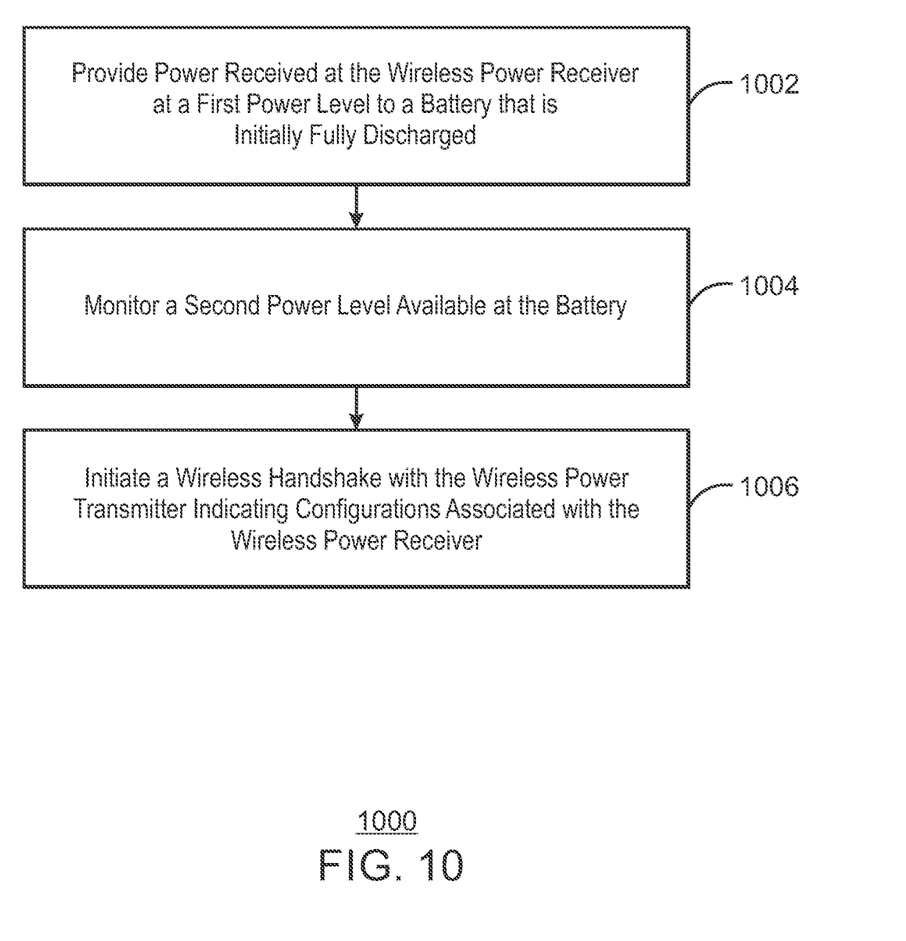
FIG. 10 is a block diagram illustrating a method 1000 for charging a fully discharged battery in a wireless charging environment.

FIG. 10 is a block diagram illustrating a method 1000 for charging a fully discharged battery in a wireless charging environment. At block 1002, power received at a wireless power receiver at a first power level is provided to a battery that is initially fully discharged. The power at the first power level is received during a predefined interval at a wireless power transmitter inductively coupled to the wireless power receiver. At block 1004, a second power level in relation to the first power level is monitored at the battery, and at 1006, a wireless handshake is initiated with the wireless power transmitter. The wireless handshake indicates configurations associated with the wireless power receiver. The wireless handshake is initiated upon detection that the second power level meets or exceeds a predefined threshold.

In some cases, the method 1000 may include providing power received at the wireless power receiver at a third power level to the battery. The third power level is higher than the first power level. In other words, the third power level is provided after the handshake has confirmed accurate configurations and charging protocols between the wireless power receiver and the wireless power transmitter. In some cases, the wireless handshake is only performed until the battery has enough power to be used to supply power for the wireless handshake. In some cases, the wireless handshake is performed using available power at the first power level, as well as battery power.

In some cases, the fully discharged battery protocol is initiated upon detection of a sensor signal at the wireless power transmitter indicating the battery is fully discharged at the wireless power receiver. The sensor signal may be initiated at a touch sensor at the wireless power transmitter. In some cases, the predefined interval associated with the wireless charging protocol may be configurable by a user based on a predefined interaction at the touch sensor. In some cases, the sensor signal is initiated by detection of a near field communication coil associated with the fully discharged battery.

Examples provided herein may include elements of the techniques discussed above and throughout the claims, description, and figures. In some cases, combinations of various elements may be implemented.

Example 1 is an apparatus for charging through a wireless power receiver, comprising a means for: providing power received at the wireless power receiver at a first power level to a battery that is initially fully discharged. In this example, the power of the first power level is received during a predefined interval associated with a fully discharged battery protocol initiated at a wireless power transmitter inductively coupled to the wireless power receiver, monitoring a second power level available at the battery, and initiating a wireless handshake with the wireless power transmitter indicating configurations associated with the wireless power receiver.

In this example, the wireless handshake is initiated upon detection that the second power level meets or exceeds a predefined threshold.

Example 2 includes the apparatus of example 1. In this example upon completion of the wireless handshake the means is further configured to provide power received at the wireless power receiver at a third power level to the battery. In this example, the third power level is higher than the first power level.

Example 3 includes the apparatus of any combination of examples 1-2. In this example, the wireless handshake is an operation performed using available battery power.

Example 4 includes the apparatus of any combination of examples 1-3. In this example, the wireless handshake is an operation performed using available battery power as well as the power at the first power level.

Example 5 includes the apparatus of any combination of examples 1-4. In this example, the fully discharged battery protocol is initiated upon detection of a sensor signal at the wireless power transmitter indicating the battery is fully discharged.

Example 6 includes the apparatus of any combination of examples 1-5. In this example, the sensor signal is initiated at a touch sensor at the wireless power transmitter.

Example 7 includes the apparatus of any combination of examples 1-6. In this example, the predefined interval is configurable by a user based on a predefined interaction at the touch sensor.

Example 8 includes the apparatus of any combination of examples 1-7. In this example, the sensor signal is initiated by detecting a presence of near field communication coil associated with the fully discharged battery.

Example 9 includes the apparatus of any combination of examples 1-8. In this example, the wireless handshake may include a Bluetooth Low Energy (BLE) wireless communication.

Example 10 includes the apparatus of any combination of examples 1-9. In this example, the wireless handshake may include a load modulation of power received at the wireless power receiver detected at a controller associated with the wireless power transmitter.

Example 11 is a method for charging in a wireless power receiver comprising: providing power received at the wireless power receiver at a first power level to a battery that is initially fully discharged. In this example, the power of the first power level is received during a predefined interval associated with a fully discharged battery protocol initiated at a wireless power transmitter inductively coupled to the wireless power receiver, monitoring a second power level available at the battery, and initiating a wireless handshake with the wireless power transmitter indicating configurations associated with the wireless power receiver. In this example, the wireless handshake is initiated upon detection that the second power level meets or exceeds a predefined threshold.

Example 12 includes the method of example 11. In this example upon completion of the wireless handshake the method further may include providing power received at the wireless power receiver at a third power level to the battery. In this example, the third power level is higher than the first power level.

Example 13 includes the method of any combination of examples 11-12. In this example, the wireless handshake is an operation performed using available battery power.

Example 14 includes the method of any combination of examples 11-13. In this example, the wireless handshake is an operation performed using available battery power as well as the power at the first power level.

Example 15 includes the method of any combination of examples 11-14. In this example, the fully discharged battery protocol is initiated upon detection of a sensor signal at the wireless power transmitter indicating the battery is fully discharged.

Example 16 includes the method of any combination of examples 11-15. In this example, the sensor signal is initiated at a touch sensor at the wireless power transmitter.

Example 17 includes the method of any combination of examples 11-16. In this example, the predefined interval is configurable by a user based on a predefined interaction at the touch sensor.

Example 18 includes the method of any combination of examples 11-17. In this example, the sensor signal is initiated by detecting a presence of near field communication coil associated with the fully discharged battery.

Example 19 includes the method of any combination of examples 11-18. In this example, the wireless handshake may include a Bluetooth Low Energy (BLE) wireless communication.

Example 20 includes the method of any combination of examples 11-19. In this example, the wireless handshake may include a load modulation of power received at the wireless power receiver detected at a controller associated with the wireless power transmitter.

Example 21 is a system for wireless charging. In this example, the wireless charging device may include wireless power receiving means to inductively couple to wireless power transmitting coil, a battery associated with the wireless power receiving means, power logic to: provide power received at the wireless power receiver at a first power level to the battery when it is initially fully discharged. In this example, the power of the first power level is received during a predefined interval associated with a fully discharged battery protocol initiated at a wireless power transmitter inductively coupled to the wireless power receiver, monitor a second power level available at the battery, and initiate a wireless handshake with the wireless power transmitter indicating configurations associated with the wireless power receiver. In this example, the wireless handshake is initiated upon detection that the second power level meets or exceeds a predefined threshold.

Example 22 includes the system of example 21. In this example upon completion of the wireless handshake the logic is further configured to provide power received at the wireless power receiver at a third power level to the battery. In this example, the third power level is higher than the first power level.

Example 23 includes the system of any combination of examples 21-22. In this example, the wireless handshake is an operation performed using available battery power.

Example 24 includes the system of any combination of examples 21-23. In this example, the wireless handshake is an operation performed using available battery power as well as the power at the first power level.

Example 25 includes the system of any combination of examples 21-24. In this example, the fully discharged battery protocol is initiated upon detection of a sensor signal at the wireless power transmitter indicating the battery is fully discharged.

Example 26 includes the system of any combination of examples 21-25. In this example, the sensor signal is initiated at a touch sensor at the wireless power transmitter.

Example 27 includes the system of any combination of examples 21-26. In this example, the predefined interval is configurable by a user based on a predefined interaction at the touch sensor.

Example 28 includes the system of any combination of examples 21-27. In this example, the sensor signal is initiated by detecting a presence of near field communication coil associated with the fully discharged battery.

Example 29 includes the system of any combination of examples 21-28. In this example, the wireless handshake may include a Bluetooth Low Energy (BLE) wireless communication.

Example 30 includes the system of any combination of examples 21-29. In this example, the wireless handshake may include a load modulation of power received at the wireless power receiver detected at a controller associated with the wireless power transmitter.

Example 31 is an apparatus for charging through a wireless power receiver, comprising logic, at least partially comprising hardware logic, configured to: provide power received at the wireless power receiver at a first power level to a battery that is initially fully discharged. In this example, the power of the first power level is received during a predefined interval associated with a fully discharged battery protocol initiated at a wireless power transmitter inductively coupled to the wireless power receiver, monitor a second power level available at the battery, and initiate a wireless handshake with the wireless power transmitter indicating configurations associated with the wireless power receiver. In this example, the wireless handshake is initiated upon detection that the second power level meets or exceeds a predefined threshold.

Example 32 includes the apparatus of example 31. In this example upon completion of the wireless handshake the logic is further configured to provide power received at the wireless power receiver at a third power level to the battery. In this example, the third power level is higher than the first power level.

Example 33 includes the apparatus of any combination of examples 31-32. In this example, the wireless handshake is an operation performed using available battery power.

Example 34 includes the apparatus of any combination of examples 31-33. In this example, the wireless handshake is an operation performed using available battery power as well as the power at the first power level.

Example 35 includes the apparatus of any combination of examples 31-34. In this example, the fully discharged battery protocol is initiated upon detection of a sensor signal at the wireless power transmitter indicating the battery is fully discharged.

Example 36 includes the apparatus of any combination of examples 31-35. In this example, the sensor signal is initiated at a touch sensor at the wireless power transmitter.

Example 37 includes the apparatus of any combination of examples 31-36. In this example, the predefined interval is configurable by a user based on a predefined interaction at the touch sensor.

Example 38 includes the apparatus of any combination of examples 31-37. In this example, the sensor signal is initiated by detecting a presence of near field communication coil associated with the fully discharged battery.

Example 39 includes the apparatus of any combination of examples 31-38. In this example, the wireless handshake may include a Bluetooth Low Energy (BLE) wireless communication.

Example 40 includes the apparatus of any combination of examples 31-39. In this example, the wireless handshake may include a load modulation of power received at the wireless power receiver detected at a controller associated with the wireless power transmitter.

Example 41 is a system for wireless charging. In this example, the wireless charging device may include wireless power receiving means to inductively couple to wireless power transmitting coil, a battery associated with the wireless power receiving means, power regulation means configured to: provide power received at the wireless power receiver at a first power level to the battery when it is initially fully discharged. In this example, the power of the first power level is received during a predefined interval associated with a fully discharged battery protocol initiated at a wireless power transmitter inductively coupled to the wireless power receiver, monitor a second power level available at the battery, and initiate a wireless handshake with the wireless power transmitter indicating configurations associated with the wireless power receiver. In this example, the wireless handshake is initiated upon detection that the second power level meets or exceeds a predefined threshold.

Example 42 includes the system of example 41. In this example upon completion of the wireless handshake the regulation means is further configured to provide power received at the wireless power receiver at a third power level to the battery. In this example, the third power level is higher than the first power level.

Example 43 includes the system of any combination of examples 41-42. In this example, the wireless handshake is an operation performed using available battery power.

Example 44 includes the system of any combination of examples 41-43. In this example, the wireless handshake is an operation performed using available battery power as well as the power at the first power level 45. In this example, the system of any combination of claims 41-42. In this example, the fully discharged battery protocol is initiated upon detection of a sensor signal at the wireless power transmitter indicating the battery is fully discharged.

Example 45 includes the system of any combination of examples 41-44. In this example, the sensor signal is initiated at a touch sensor at the wireless power transmitter.

Example 46 includes the system of any combination of examples 41-45. In this example, the predefined interval is configurable by a user based on a predefined interaction at the touch sensor.

Example 47 includes the system of any combination of examples 41-46. In this example, the sensor signal is initiated by detecting a presence of near field communication coil associated with the fully discharged battery.

Example 48 includes the system of any combination of examples 41-47. In this example, the wireless handshake may include a Bluetooth Low Energy (BLE) wireless communication.

Example 49 includes the system of any combination of examples 41-48. In this example, the wireless handshake may include a load modulation of power received at the wireless power receiver detected at a controller associated with the wireless power transmitter.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A wireless power receiver, comprising:
    a battery;
    a receiving coil configured to inductively couple to a transmitting coil;
    a rectifier to receive Alternating Current (AC) power from the receiving coil and output a DC voltage to a voltage rail, wherein power received at the wireless power receiver is transmitted at a first power level if the battery is initially fully discharged, wherein the power of the first power level is received during a predefined interval of a fully discharged battery protocol;
    logic circuitry to monitor a second power level available at the battery; and
    wireless communication circuitry to initiate a wireless handshake with the wireless power transmitter to indicate configurations of the wireless power receiver;
    wherein the logic circuitry is to:
    couple the voltage rail to the wireless communication circuitry if the second power level available at the battery is below a predefined threshold; and
    couple an output of the battery to the wireless communication circuitry if the second power level available at the battery is above the predefined threshold.

2. The apparatus of claim 1, wherein upon completion of the wireless handshake the logic is further configured to supply power received at the wireless power receiver at a third power level to the battery, wherein the third power level is higher than the first power level.

3. The apparatus of claim 1, wherein the fully discharged battery protocol is initiated upon detection of a sensor signal at the wireless power transmitter indicating the battery is fully discharged.

4. The apparatus of claim 3, wherein the sensor signal is initiated at a touch sensor at the wireless power transmitter.

5. The apparatus of claim 4, wherein the predefined interval is configurable by a user based on a predefined interaction at the touch sensor.

6. The apparatus of claim 3, wherein the sensor signal is initiated by detecting a presence of near field communication coil associated with the fully discharged battery.

7. The apparatus of claim 1, wherein the wireless handshake comprises a Bluetooth Low Energy (BLE) wireless communication.

8. The apparatus of claim 1, wherein the wireless handshake comprises a load modulation of power received at the wireless power receiver detected at a controller associated with the wireless power transmitter.

9. A method for charging in a wireless power receiver comprising:
    receiving power at the wireless power receiver at a first power level if a battery is initially fully discharged, wherein the power of the first power level is received during a predefined interval of a fully discharged battery protocol;
    rectifying the received power to provide a DC voltage to a voltage rail;
    monitoring a second power level available at the battery; and
    initiating, via wireless communication circuitry, a wireless handshake with a wireless power transmitter inductively coupled to the wireless power receiver indicating configurations of the wireless power receiver;
    coupling the voltage rail to the wireless communication circuitry if the second power level available at the battery is below a predefined threshold; and
    coupling an output of the battery to the wireless communication circuitry if the second power level available at the battery is above the predefined threshold.

10. The method of claim 9, wherein upon completion of the wireless handshake the method further comprises supplying power received at the wireless power receiver at a third power level to the battery, wherein the third power level is higher than the first power level.

11. The method of claim 9, wherein the fully discharged battery protocol is initiated upon detection of a sensor signal at the wireless power transmitter indicating the battery is fully discharged.

12. The method of claim 11, wherein the sensor signal is initiated at a touch sensor at the wireless power transmitter.

13. The method of claim 12, wherein the predefined interval is configurable by a user based on a predefined interaction at the touch sensor.

14. The method of claim 11, wherein the sensor signal is initiated by detecting a presence of near field communication coil associated with the fully discharged battery.

15. The method of claim 9, wherein the wireless handshake comprises a Bluetooth Low Energy (BLE) wireless communication.

16. The method of claim 9, wherein the wireless handshake comprises a load modulation of power received at the wireless power receiver detected at a controller of the wireless power transmitter.

17. A system for wireless charging, comprising:
a wireless power receiving coil to inductively couple to a wireless power transmitting coil of a wireless power transmitter;
a battery associated with the wireless power receiving coil; and
circuitry to:
   convert Alternating Current (AC) power received from the wireless power receiving coil to a DC voltage of a voltage rail, wherein the AC power received at the wireless power receiver is received at a first power level if the battery is initially fully discharged, wherein the power of the first power level is received during a predefined interval of a fully discharged battery protocol;
   monitor a second power level available at the battery;
   initiate, via wireless communication circuitry, a wireless handshake with the wireless power transmitter to indicate configurations of the wireless power receiver;
   couple the voltage rail to the wireless communication circuitry if the second power level available at the battery is below a predefined threshold; and
   couple an output of the battery to the wireless communication circuitry if the second power level available at the battery is above the predefined threshold.

18. The system of claim 17, wherein upon completion of the wireless handshake the logic is further configured to supply power received at the wireless power receiver at a third power level to the battery, wherein the third power level is higher than the first power level.

19. The system of claim 17, wherein the fully discharged battery protocol is initiated upon detection of a sensor signal at the wireless power transmitter indicating the battery is fully discharged.

20. The system of claim 19, wherein the sensor signal is initiated at a touch sensor at the wireless power transmitter, wherein the predefined interval is configurable by a user based on a predefined interaction at the touch sensor.

* * * * *